(12) United States Patent
Li

(10) Patent No.: US 8,710,965 B2
(45) Date of Patent: Apr. 29, 2014

(54) DEVICES, SYSTEMS, AND METHODS FOR TACTILE FEEDBACK AND INPUT

(75) Inventor: Kevin Ansia Li, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 435 days.

(21) Appl. No.: 12/887,643

(22) Filed: Sep. 22, 2010

(65) Prior Publication Data
US 2012/0068835 A1    Mar. 22, 2012

(51) Int. Cl.
*H04B 3/36*    (2006.01)

(52) U.S. Cl.
USPC ..................................... 340/407.1; 340/407.2

(58) Field of Classification Search
None
See application file for complete search history.

(56) References Cited

U.S. PATENT DOCUMENTS

| | | | |
|---|---|---|---|
| 4,581,491 A * | 4/1986 | Boothroyd | 607/118 |
| 4,728,934 A * | 3/1988 | Pfander et al. | 340/407.1 |
| 5,337,364 A * | 8/1994 | Fitch | 381/151 |
| 5,857,986 A * | 1/1999 | Moriyasu | 601/49 |
| 6,483,917 B1 | 11/2002 | Kang | |
| 6,741,721 B2 * | 5/2004 | Fukawatase et al. | 381/401 |
| 6,885,876 B2 * | 4/2005 | Aaltonen et al. | 455/550.1 |
| 7,319,773 B2 | 1/2008 | Lee | |
| 7,616,192 B2 * | 11/2009 | Schroeder | 345/173 |
| 7,681,949 B2 | 3/2010 | Nathan et al. | |
| 7,720,213 B2 | 5/2010 | Desai et al. | |
| 7,777,716 B2 * | 8/2010 | Rosenberg et al. | 345/156 |
| 8,063,892 B2 * | 11/2011 | Shahoian et al. | 345/173 |
| 8,063,893 B2 * | 11/2011 | Rosenberg et al. | 345/173 |
| 8,260,972 B2 * | 9/2012 | Cruz-Hernandez et al. | 710/5 |
| 8,316,166 B2 * | 11/2012 | Grant et al. | 710/73 |
| 2002/0114486 A1 * | 8/2002 | Fukawatase et al. | 381/401 |
| 2002/0128048 A1 * | 9/2002 | Aaltonen et al. | 455/567 |
| 2002/0131612 A1 | 9/2002 | Son | |
| 2003/0236456 A1 | 12/2003 | Graham et al. | |
| 2006/0165246 A1 | 7/2006 | Lee | |
| 2006/0288137 A1 * | 12/2006 | Grant et al. | 710/62 |
| 2007/0160239 A1 | 7/2007 | Fukuda | |
| 2010/0225596 A1 | 9/2010 | Eldering | |
| 2010/0285771 A1 * | 11/2010 | Peabody | 455/404.2 |

OTHER PUBLICATIONS

Lilly Spirkovska. "Summary of Tactile User Interfaces Techniques and Systems." NASA Ames Research Center, Sep. 22, 2004 <http://ti.arc.nasa.gov/m/pub/archive/0905.pdf>.

Li, Kevin A., "Staying in Touch with Tactile Messaging", ACM International Conference on Ubiquitous Computing, Sep. 26-29, 2010, Copenhagen, Denmark.

Griswold, William G., "Summary of Recent Research (2005-2008)", http://cseweb.ucsd.edu/users/wgg/Statements/2008/research-08-cv.pdf, retrieved via Internet on Nov. 27, 2013.

* cited by examiner

*Primary Examiner* — Travis Hunnings
(74) *Attorney, Agent, or Firm* — Hartman & Citrin LLC

(57) ABSTRACT

Devices and methods are disclosed which relate to tactile communication. Devices are included for direct tactile input and having logic for conversion of speech and other forms of audio into vibrotactile sequences. Vibrotactile sequences are transmitted to devices equipped with tactile output, such as vibrators. Voice coil vibrators create sensations of tapping and rubbing in addition to vibration.

15 Claims, 7 Drawing Sheets

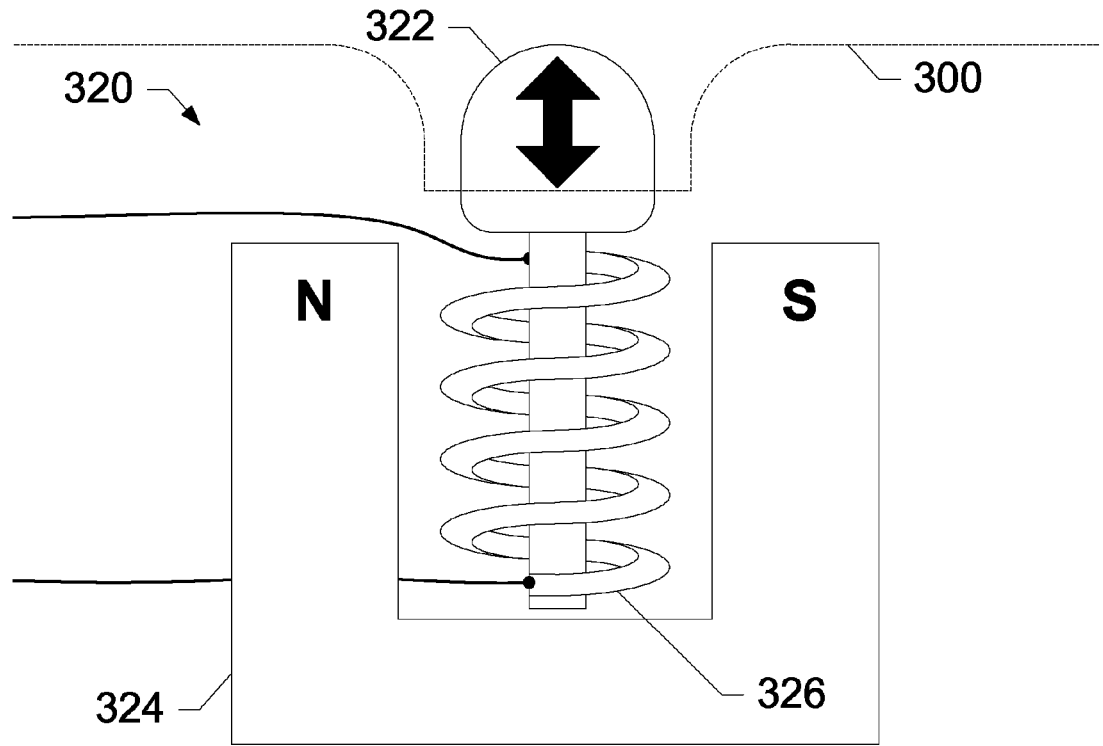
FIG. 3
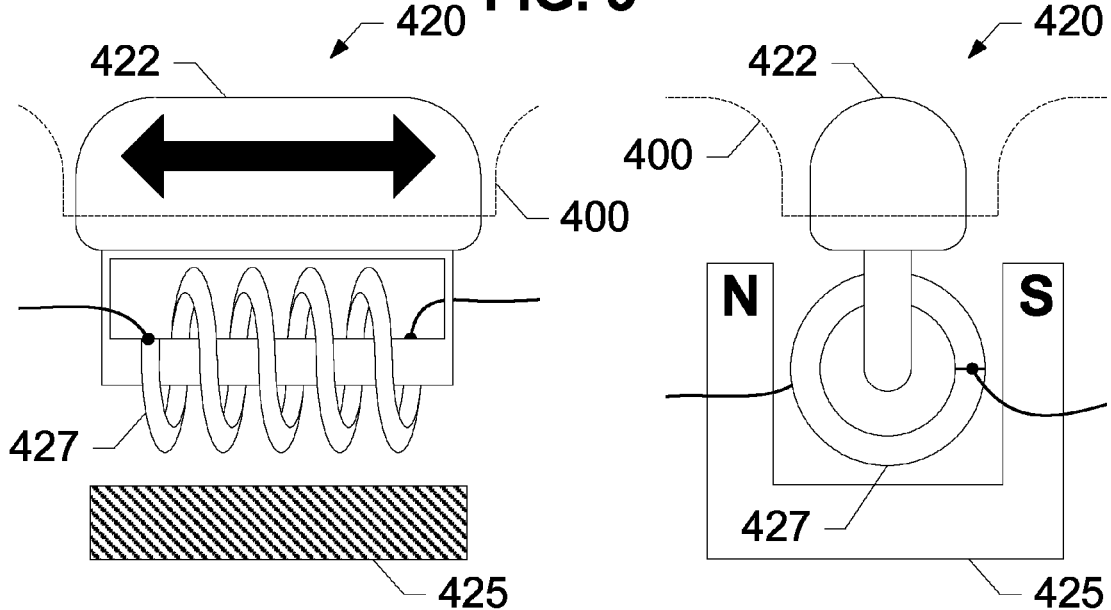
FIG. 4A  FIG. 4B

DEVICES, SYSTEMS, AND METHODS FOR TACTILE FEEDBACK AND INPUT

BACKGROUND OF THE INVENTION

1. Field of the Invention

The present invention relates to haptic interfaces. More specifically, the present invention relates to incorporating haptic technology in portable electronic devices to convey different types of information to a user.

2. Background of the Invention

As the information revolution continues to unfold, more and more types of information are being communicated to a user via electronic devices. For instance, computers and input/output (I/O) devices are increasingly being incorporated into aspects of a user's life, such as for communication (cellular telephones, laptops, etc.), transportation (cars, buses, airplanes), home appliances, sports equipment, etc.

A human being typically receives information through several senses and combinations of senses such as visual, auditory, smell/taste, tactile, etc. However, traditional user interfaces for electronic/computing devices almost exclusively use a visual channel for displaying information to a user, combined with auditory signals for conveying limited types of information. For instance, most electronic devices include an LCD, LED, or equivalent display to communicate images and words to a user, or at least LED indicators to indicate a status of the device. Most modern portable computers have high-resolution displays that are able to communicate a plethora of information simultaneously via a rich visual interface. Mobile devices such as cellular telephones have adopted this rich visual interface. For instance, devices such as Apple's iPhone® or other smart phones are essentially smaller versions of traditional desktop computer interfaces.

However, one problem with this approach is the underlying assumption that the visual sense of the user will always be available. Today's average mobile users finds themselves in an increasing number of scenarios where looking at the phone may be unsafe or socially unacceptable, or where the visual sense is otherwise occupied. For instance, looking at a user interface while driving is a known hazard, and laws in many states prohibit usage of mobile consumer electronics while operating a motor vehicle. Diverting one's visual attention from a presenter at a meeting, for instance, is an additional faux pas that is considered disruptive or socially unacceptable. In some cases, visually impaired users cannot even see visual interfaces, much less use them.

Another problem with the visual channel is that it is only useful for viewing certain types of information such as text, charts or maps. For instance, in human-to-human interaction, mobile user interfaces may be effective in conveying semantic information (i.e. where/when to meet up for lunch), but are relatively poor communication channels for conveying intent and emotion. Orthographic conventions and emoticons can be used to approximate this type of information to some extent, but clearly do not attain the same level of richness as face-to-face communication.

A potential alternative to traditional visual-based communication is to use auditory messages. Currently, a number of mobile devices use text-to-speech software to convert text messages to auditory messages. Other services allow users to record and send each other auditory messages. Since these auditory messages are simply messages read aloud, they are easy to understand, and do not divert the user's attention from a task requiring visual attention, such as driving.

However, this auditory approach to providing feedback still has a number of drawbacks. First, a user's visual attention may be required to manipulate the device, which can be unsafe when driving or socially unacceptable when in a meeting. Furthermore, audio cannot always be heard because of environmental factors such as a busy road, or at a loud concert. Moreover, audio information may not always be appropriate in settings such a business meeting, where both the auditory and visual senses are occupied by a presenter.

A third type of output in use today involves the user of tactile feedback. A common example of this type of feedback is vibrating mobile devices. However, the functionality here is limited. The only alert that is prevalent in use today is a vibrating indicator that another party is trying to reach the user, for instance, by alerting an incoming call or message. Further, the potential of these vibrating mechanisms are not currently fully exploited to communicate any additional information besides semantic or alert information. Mapping messages to phone vibrators is a non-trivial process. The vibrators on commodity mobile phones only turn on and off, and present software API provides no mechanism for adjusting the vibrating signal.

Therefore, what is needed is means to communicate a variety of information to a user using a physical sensation while the user's auditory and visual senses are otherwise occupied.

SUMMARY OF THE INVENTION

The present invention solves the aforementioned need via devices, systems, and methods for incorporating haptic or vibrotactile technology. Exemplary embodiments of the present invention include devices for direct tactile input and having logic for conversion of speech and other forms of audio into vibrotactile sequences. Vibrotactile sequences are transmitted to devices equipped with tactile output, such as vibrators. Voice coil vibrators create sensations of tapping and rubbing in addition to vibration.

In one exemplary embodiment, the present invention is a tactile communication device. The tactile communication device includes a processor, a memory in communication with the processor, a transceiver in communication with the processor, and a vibrator in communication with the processor. The processor instructs the vibrator to vibrate according to a vibrotactile sequence.

In another exemplary embodiment, the present invention is a tactile communication system. The tactile communication system includes a tactile communication device including a vibrator, and a control communication device in communication with the tactile communication device, the control communication device including a tactile input. The control communication device sends a vibrotactile sequence from the tactile input to the tactile communication device, and the tactile communication device activates the vibrator according to the vibrotactile sequence.

In yet another exemplary embodiment, the present invention is a method of tactile communication. The method includes receiving a vibrotactile sequence from a control communication device, and activating a vibrator according to the vibrotactile sequence.

BRIEF DESCRIPTION OF THE DRAWINGS

FIG. 3 shows a voice coil vibrator for producing tactile feedback, according to an exemplary embodiment of the present invention.

FIGS. 4A and 4B show a voice coil vibrator for producing tactile feedback, according to an exemplary embodiment of the present invention.

DETAILED DESCRIPTION OF THE INVENTION

Figure 1:
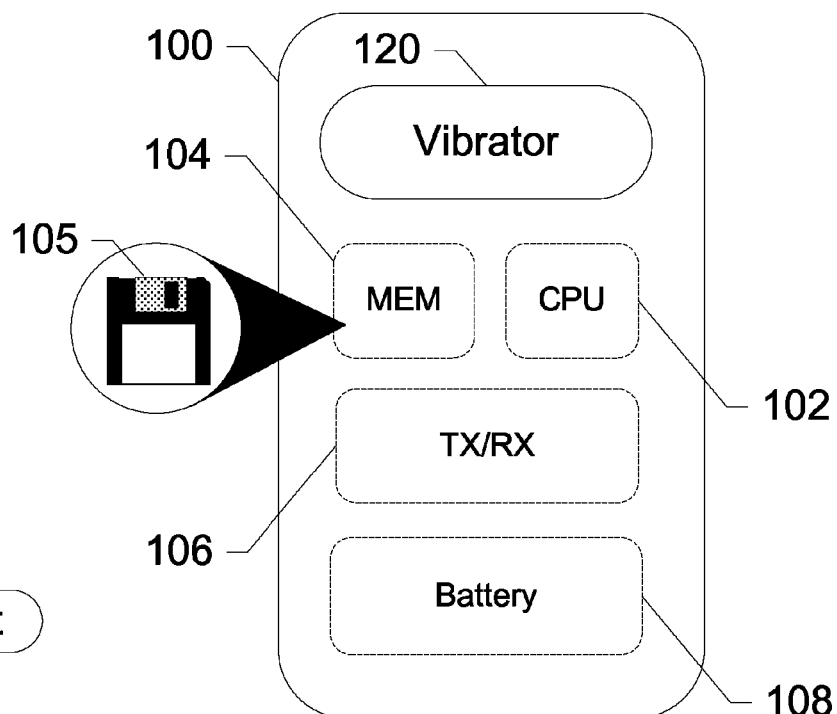
FIG. 1 shows a tactile communication device for providing tactile feedback, according to an exemplary embodiment of the present invention.

The present invention includes devices, systems, and methods for tactile communication. Exemplary embodiments of the present invention include devices for direct tactile input and having logic for conversion of speech and other forms of audio into vibrotactile sequences. Vibrotactile sequences are transmitted to haptic devices, such as vibrators. For instance, voice coil vibrators are used to create sensations of tapping and rubbing in addition to vibration.

Furthermore, current communication devices equipped with conventional vibrators are loaded with pitch modulation logic enabling the vibrators to output more specific tactile information such as pitch and intensity. Software techniques similar to pulse width modulation are used to create different levels of intensity. Switching the motor on and off at different frequencies can yield different intensities of vibration. Pulse modulation is a technique where the soft switch is turned off and on many times per second in order to power a vibrator with an amount of power that is somewhere in between on and off. For instance, to give the vibrator half as much power as it receives when turned on, the pulse modulation logic turns the vibrator on and off at an even pace for a duration. Theoretically, this pace can be twice per second, which turns the vibrator on for half of a second, then turns the vibrator off for half of a second. The average power over that second is exactly half. More often, however, this pace is many times per second. The faster the pace, the more constant the power flow seems to the user. Other paces are used to create different levels of power. For instance turning the vibrator on for three-quarters of the time and turning off the vibrator for the remainder creates an average of 75% power. Likewise, turning the vibrator on for one-quarter of the time and turning off the vibrator for the remainder creates an average of 25% power. By varying how long the motor is pulsed on for, 10 user differentiable levels of vibration can be generated for a minimum duration of 20 ms.

This process allows the capture of the energy level of music into a vibrotactile sequence—a process involving the following steps. First, noise and voice are removed using a series of filters. Next, a running sum of the absolute value is taken over a period, for instance, generating 1 value every 20 ms. This keeps the length of the music cue and vibrotactile sequence consistent. Finally, the resulting output is composed with a power function to exaggerate the features. The result is a sequence of vibration intensity values, with each value representing a vibrotactile pulse of 20 ms.

"Communication device", as used herein and throughout this disclosure, refers to any electronic device capable of wirelessly sending and receiving data. A communication device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEP ROMS (electrically erasable programmable read-only memories).

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

Communication devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH®. Communication across a network is preferably packet-based; however, radio and frequency/amplitude modulations networks can enable communication between wireless communication devices using appropriate analog-digital-analog converters and other elements. Communication is enabled by hardware elements called "transceivers." Wireless communication devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A network typically includes a plurality of elements that host logic for performing tasks on the network.

A "vibrotactile sequence", as used herein and throughout this disclosure, refers to a software or computer code containing instructions for powering a vibrator or other means of haptic output in a specific manner. For example, each step in a vibrotactile sequence instructs a vibrator to vibrate at a different frequency and intensity, and there can be many steps per second in a sequence. For vibrators capable of rubbing and tapping, the sequence contains code to affect a rubbing or tapping as well as vibrating.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a tactile communication device 100 for providing tactile feedback, according to an exemplary embodiment of the present invention. In this embodiment, device 100 includes a vibrator 120, a memory 104, a central processing unit (CPU) 102, a transceiver 106, and a battery 108. Vibrator 120 utilizes a rotational actuator to provide a vibrating sensation. The rotational actuator converts a received electrical signal into motion. A weight is attached to the rotational actuator with the center of mass offset from the center of rotation. The rotation of the offset weight causes a vibration at the natural frequency or resonant frequency of the vibrator, which depends on the weight and the offset distance. Vibrator 120 is made to vibrate at a frequency around 250 Hz, the frequency at which human skin is most sensitive. CPU 102 controls the components of tactile communication device 100 according to logic on memory 104. Memory 104 contains logic to adjust preferences and settings for tactile communication device 100. Memory also includes a pulse modulation logic 105. Pulse modulation logic 105 contains instructions for modulating the signal transmitted to vibrator 120. Vibrator 120 is controlled by a single soft switch which turns the vibrator on or off. Pulse modulation logic 105 toggles the soft switch at different intervals, enabling vibrator 120 to vibrate at different frequencies. Pulse modulation logic 105, for instance, enables vibrator 120 to emulate a ringtone on tactile communication device 100. The tactile-based methods of pulse modulation logic 105 may allow vibrator 120 to convey information to the user of tactile communication device 100 based upon the vibration produced. Transceiver 106 allows tactile communication device 100 to communicate with other devices and networks. This communication may occur over a cellular network, a near field communication (NFC), etc. NFC may include communications over BLUETOOTH®, WiFi, RFID, infrared, etc. Battery 108 provides a power source for the components of tactile communication device 100.

Figure 2:
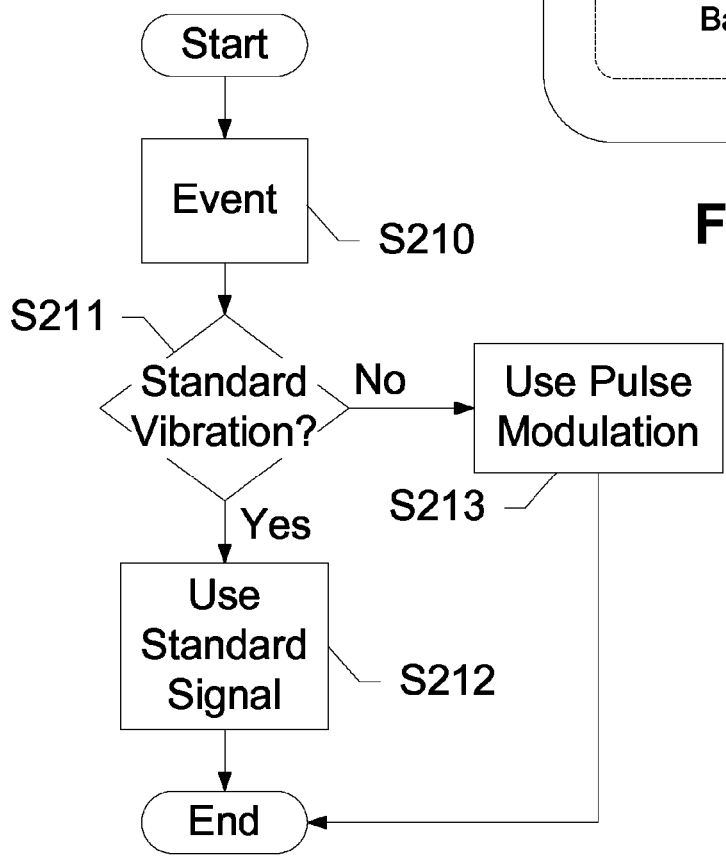
FIG. 2 shows a method of providing tactile output from a tactile communication device, according to an exemplary embodiment of the present invention.

FIG. 2 shows a method of providing tactile output from a tactile communication device, according to an exemplary embodiment of the present invention. In this embodiment, the method begins with an event S210 triggering a vibrator of the tactile communication device. The tactile communication device determines whether it is programmed to use a standard vibration for the event S211. If the tactile communication device is programmed to use a standard vibration for the event, then the CPU of the tactile communication device sends a standard signal S212 to the vibrator and the vibrator vibrates normally, i.e. powering on the soft switch for a predefined duration. If the tactile communication device determines that the event dictates a non-standard vibration, such as a vibrotactile sequence, the CPU of the tactile communication device uses pulse width modulation S213 to create the non-standard vibration.

As described herein, tapping and rubbing are commonly used in human-to-human communication. To generate a variety of measureable, controlled taps and rubs, a voice coil vibrator is used. Input is generated with sound waveforms from a computer or other analog audio source, which is then amplified. The resulting signal is used to drive a voice coil motor, such as those found in a speaker or a disk drive. By mounting a head onto this voice coil motor, different types of tactile feedback are generated. Taps are generated by moving the head perpendicular to the contact surface. Rubs are generated by moving the head parallel to the contact surface. Unlike vibration, tapping and rubbing convey a distinct emotional message, similar to those induced by human-human touch.

FIG. 3 shows a voice coil vibrator 320 for producing tactile feedback, according to an exemplary embodiment of the present invention. In this embodiment, voice coil vibrator 320 includes a coil 326, a magnet 324, and a head 322, and is substantially contained within a housing of tactile communication device 300. A CPU of tactile communication device 300 sends a current through coil 326, pursuant to instructions from a logic unit. The changing direction of the current in coil 326, along with the presence of magnet 324, causes coil 326 to move up and down. The frequency and amplitude of the motion are controlled by the timing of the directional change in current and the magnitude of the current. The motion causes head 322 to similarly move up and down. Head 322 is not completely covered by the casing of tactile communication device 300. Motions of head 322 may give a user a sensation, such as a tap, vibration, etc.

In this exemplary embodiment, the voice coil is oriented so that the axis of motion is perpendicular to the casing of the tactile communication device. Hence, the user may feel a tapping sensation instead of or in addition to a vibrating sensation. In other exemplary embodiments, the voice coil is oriented in other directions relative to the tactile communication device, so that the user may feel other sensations, such as rubbing.

FIGS. 4A and 4B show a voice coil vibrator 420 for producing tactile feedback, according to an exemplary embodiment of the present invention. In this embodiment, voice coil vibrator 420 includes a coil 427, a magnet 425, and a head 422, and is contained within a tactile communication device 400. FIG. 4A shows a side view of voice coil vibrator 420 wherein head 422 moves left and right with respect to the drawing. A CPU of tactile communication device 400 transmits a current (carrying a vibrotactile sequence) through coil 427. In this alignment, the changing current in coil 427, along with the presence of magnet 425, causes coil 427 to move side to side. Similar to FIG. 3, the frequency and amplitude of the motion may be controlled by the timing of the current and the magnitude of the current. The motion causes head 422 to move side to side. Head 422 is not completely covered by the casing of tactile communication device 300, such that motions of head 422 may give a user a sensation, such as rubbing, a vibration, etc. FIG. 4B shows a rotated view of voice coil vibrator 420, with the direction of motion of coil 427 being into and out of the page with respect to the drawing. Head 422 will similarly move into and out of the page with respect to the drawing. In this view, magnet 425 is more clearly seen.

There are many different configurations for achieving a tapping and rubbing output from a voice coil. Further, by utilizing additional voice coil motors inside of a head, a voice coil vibrator can be capable of both tapping and rubbing, and other conceivable motions.

Figure 5:
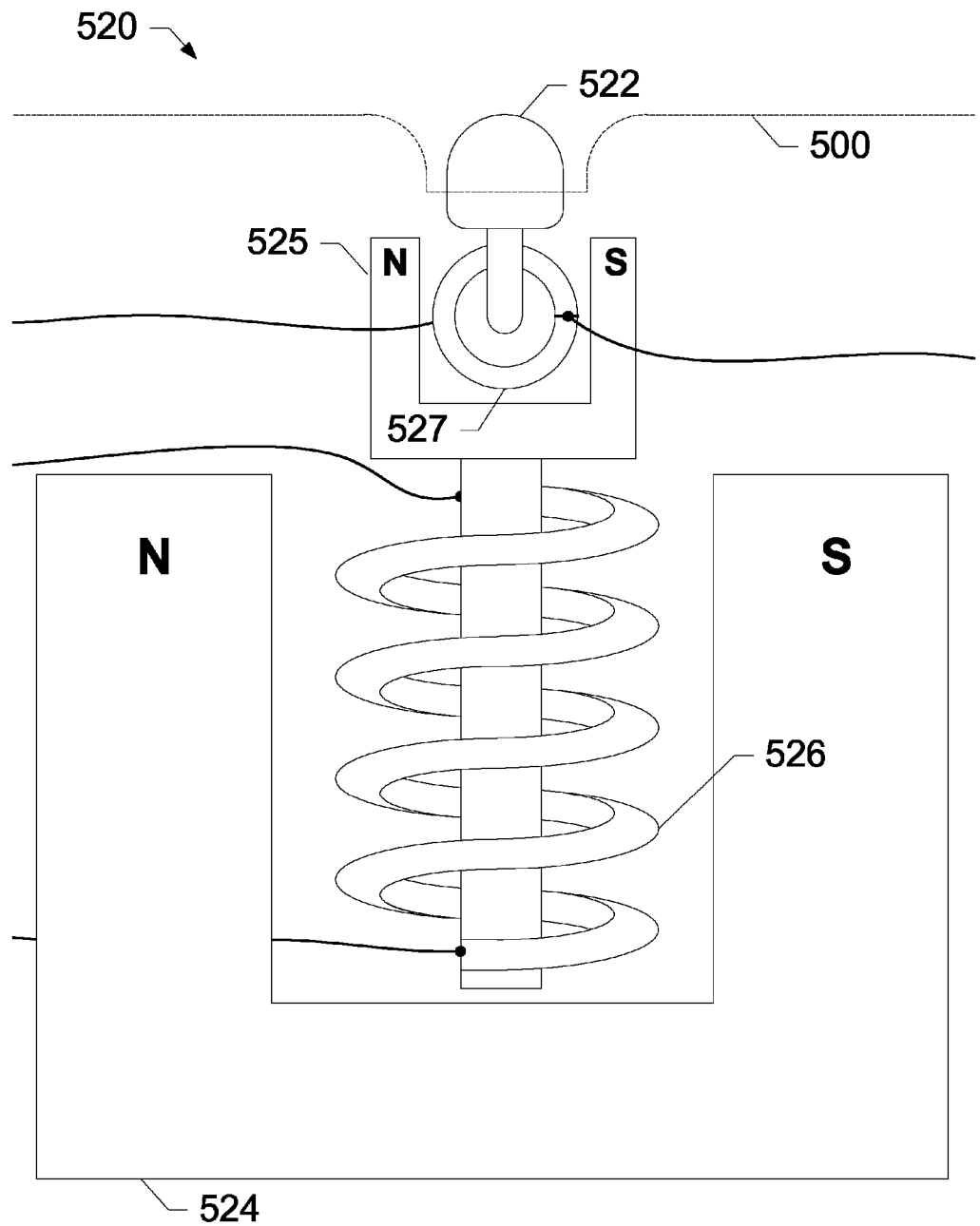
FIG. 5 shows a voice coil vibrator capable of producing both tapping and rubbing sensations, according to an exemplary embodiment of the present invention.

FIG. 5 shows a voice coil vibrator 520 capable of producing both tapping and rubbing sensations, according to an exemplary embodiment of the present invention. In this embodiment, voice coil vibrator includes a first magnet 524, a first coil 526, a second magnet 525, a second coil 527, and a head 522. Voice coil vibrator 520 is housed within a tactile communication device 500 with head 522 being partially exposed. Voice coil vibrator 520 is essentially a combination of the voice coil vibrators from FIGS. 3 and 4. Similar to FIG. 3, first magnet 524 and first coil 526 function in conjunction with head 522 to produce up and down movements. The CPU of tactile communication device 500 delivers current through coil 526 to produce these movements. Given a defined vibrotactile sequence, this can produce tapping and vibrating feedback to the user through head 522. Similar to FIG. 4, second magnet 525 and second coil 527 function to produce side to side movements. The CPU of tactile communication device 500 delivers current through coil 527 to produce these movements. This can produce rubbing and vibrating feedback to the user through head 522.

In these embodiments, the head is substantially rounded to generate a subtle, yet firm touch. A sharp or pointed head is useful for harder, more deliberate touches, a padded head generates softer touches, etc. Some embodiments of the voice coil vibrator include heads that are manipulable or switchable with other types of heads. There are many different ways to manipulate the head of a voice coil vibrator. Different heads are used to suit user preferences. Some users want a softer touch, while other users aren't as sensitive, and may need something bolder to get their attention.

Figure 6A:
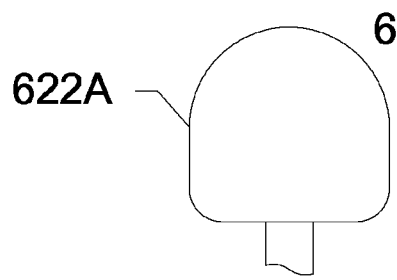
FIGS. 6A-6C show variations of heads for use with tactile communication devices, according to an exemplary embodiment of the present invention.
Figure 6B:
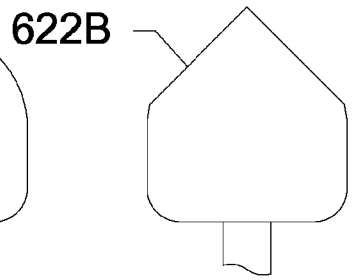
Figure 6C:
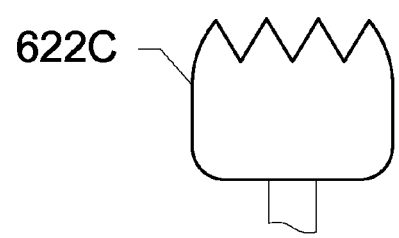

FIGS. 6A-6C show variations of heads for use with tactile communication devices, according to an exemplary embodiment of the present invention. In these embodiments, the different heads provide different sensations to a user. FIG. 6A shows a rounded head 622A. Rounded head 622A may be useful for many sensations, including vibration, rubbing, tabbing, etc. The rounded nature of rounded head 622A may make these sensations rather subtle. FIG. 6B shows a conical head 622B which may also be useful for many sensations. The pointed tip of conical head 622B may be especially useful for tapping, as the tip pokes the user creating a unique sensation. The tip also may provide a unique sensation when rubbing across the skin of the user. FIG. 6C shows a multiple-tip head 622C. Multiple-tip head 622C is capable of providing these many sensations as well. Multiple-tip head 622C provides unique sensations when vibrating, rubbing, and tapping, as the multiple tips press against the user at multiple points.

In other exemplary embodiments, the head can take on many different shapes and sizes to accommodate different users and their needs. Many other head embodiments will become apparent to those having skill in the art upon reading this disclosure.

Although primarily shown as providing haptic feedback, the disclosed embodiments can additionally focus on the input side of tactile communication. In other words, a vibrotactile sequence may be encoded into an electric current by sensing the movement of a head or vibrator tip rubbing combination of input and output logic controlling a tactile communication device may allow users to "send" taps and rubs to someone else by tapping and rubbing their own communication device.

Figure 7A:
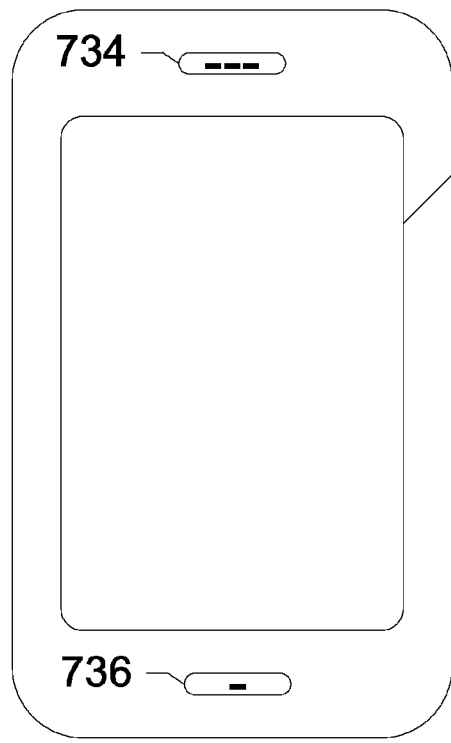
FIGS. 7A and 7B respectively show the external and internal components of a control communication device for creating and providing vibrotactile sequences, according to an exemplary embodiment of the present invention.
Figure 7B:
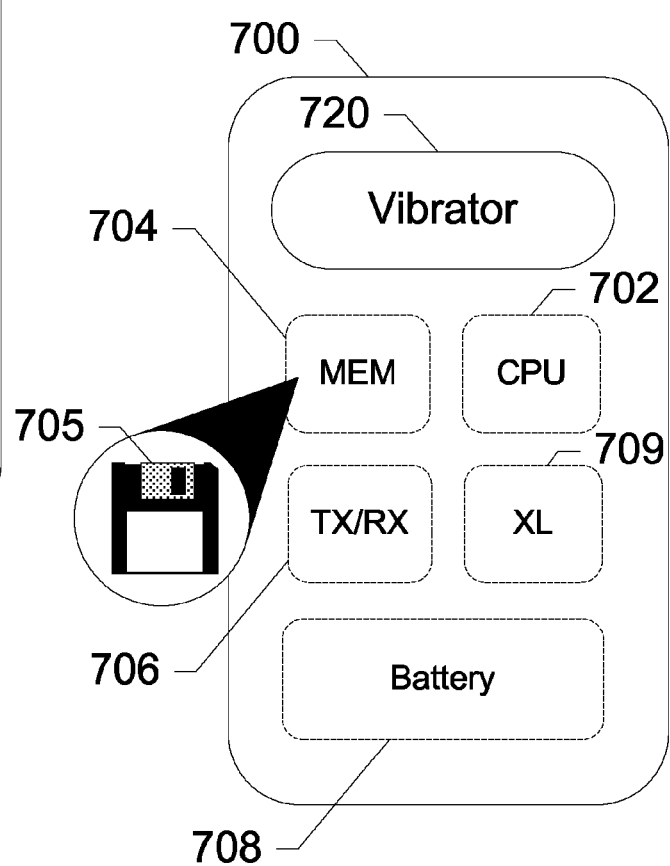

FIGS. 7A and 7B respectively show the external and internal components of a control communication device 700 for creating and providing vibrotactile sequences, according to an exemplary embodiment of the present invention. Control communication device 700 includes a display 732 for visual output, speaker 734, and microphone 736. Control communication device 700 further includes a vibrator 720, a memory 704, central processing unit (CPU) 702, a transceiver 706, an accelerometer 709, and a battery 708. Speaker 734 provides an audio output for tactile communication device 700. Display 732 is an LCD, LED, OLED, or other type of display on which a user can view selections, numbers, letters, etc. Display 732 can also be a touch screen, thereby being used as an input device in lieu of a keypad. Vibrator 720 provides tactile feedback to a user of control communication device 700. Vibrator 720 responds to electrical signals sent from CPU 702. CPU 702 controls components of control communication device 700 according to instructions in logic stored on memory 704. Memory 704 comprises any computer readable medium, such as RAM, ROM, etc. Memory 704 stores vibrotactile logic 705 for creating vibrotactile sequences, in addition to logic for operating the other components of tactile communication device 700. In conjunction with an antenna (not shown), transceiver 706 allows tactile communication device 700 to wirelessly communicate with a cellular network or with other devices across the cellular network. Transceiver 706 may be a cellular transceiver, a wireless transceiver, etc., and includes combinations of transceivers to communicate with assorted wireless networks. Transceiver 706 may enable tactile communication device 700 to wirelessly communicate over short ranges with NFC devices. Transceiver 706 can include, for instance, a BLUETOOTH® transceiver or a contactless integrated circuit card (CICC). Accelerometer 709 allows the user to create a vibrotactile sequence for a tactile communication device using control communication device 700. The user may shake or otherwise move control communication device 700 to input a vibrotactile sequence to be sent to another device. Different angles, frequencies, amplitudes, etc. of movements may correspond to different tactile information. Battery 708 provides power to each of the components of tactile communication device 700, and can include an interface to an external power supply. Vibrotactile logic 705 also converts audible clips into vibrotactile sequences.

The control communication device is an example which focuses on the input side of vibrotactile communication. In other embodiments, communication devices possess features for both input and output of vibrotactile sequences. Control communication devices may be used for unilateral communication, such as for an instructor or supervisor. Many other uses for such tactile communication will become apparent to a person having ordinary skill in the art upon reading this disclosure.

As highlighted herein, sending and receiving direct messages is convenient when a visual interface cannot be utilized. There are many other instances where visual interfaces cannot be utilized, such as in sports, driving, or other places where visual concentration is focused elsewhere. In these situations, tactile output serves as an alternative form of communication. Placement of vibrators or other forms of tactile output can be more valuable than quality of the output. For instance, trying to convey to a user to use their right or left foot from a single vibrator can be difficult for the sender, and difficult for the user to interpret. However, utilizing two vibrators, one under the left foot and one under the right foot, allows the sender to simply select a vibrator. The user easily interprets the command because only one of their feet receives the vibration. A plurality of vibrators or other forms of haptic output can be strategically placed in key locations on a single device to enable communication in different scenarios.

Figure 8:
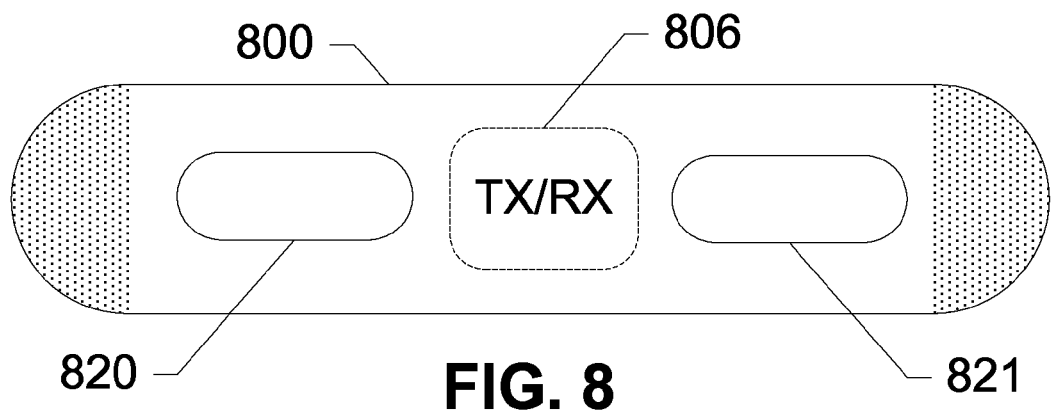
FIG. 8 shows a tactile communication device in the form of a snowboard, according to an exemplary embodiment of the present invention.

FIG. 8 shows a tactile communication device 800 in the form of a snowboard, according to an exemplary embodiment of the present invention. In this embodiment, snowboard 800 includes a first vibrator 820, a second vibrator 821, and a transceiver 806. Transceiver 806 allows tactile communication device 800 to receive vibrotactile sequences instructing first vibrator 820 and second vibrator 821 how to respond. Vibrator 820 is under the left foot while vibrator 821 is under the right foot. For example, a snowboard instructor may provide feedback from a control communication device concerning a user of tactile communication device 800's performance to the user, such as by using the device in FIG. 7. The instructor sends a vibrotactile sequence to transceiver 806. Transceiver 806 receives the vibrotactile sequence and sends instructions to first vibrator 820 and second vibrator 821 according to the vibrotactile sequence. Different types of vibrations may signify different instructions and/or feedback for the user. For instance, a tapping of both vibrators 820 and 821 may signify that the user is doing well. A vibration of vibrator 820, under the left foot, may signify that the user needs to transfer weight to the left foot. Many variations of taps, rubs, and vibrations can alert a user of snowboard 800 of many different signals. Further, a plurality of vibrators can be strategically placed in the toe, heel, and other regions of snowboard 800 to signal to a user to use different parts of his or her foot.

Figure 9:
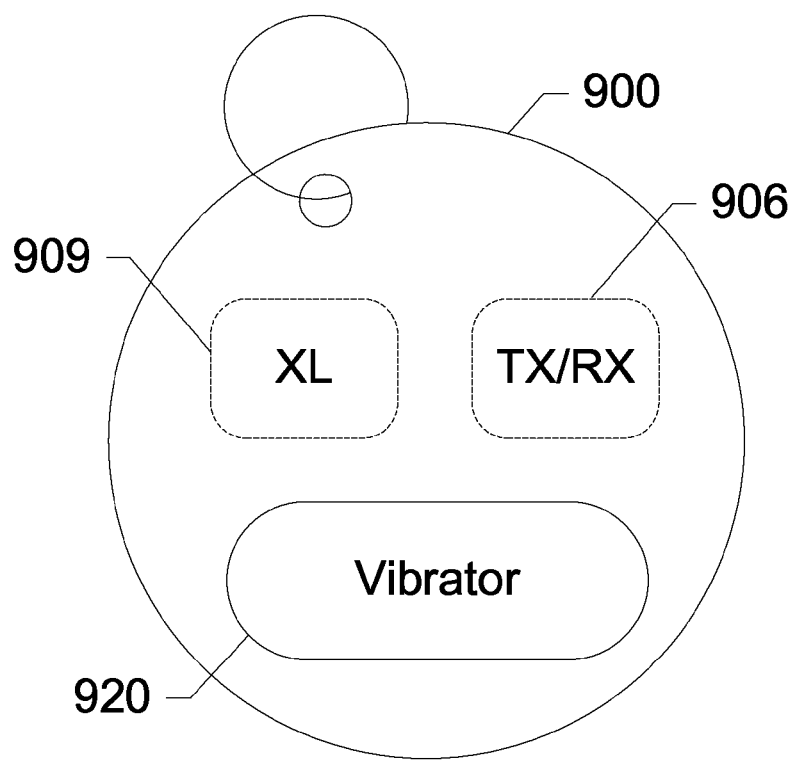
FIG. 9 shows a tactile communication device in the form of a keychain, according to an exemplary embodiment of the present invention.

FIG. 9 shows a tactile communication device 900 in the form of a keychain, according to an exemplary embodiment of the present invention. Tactile communication device 900 includes an accelerometer 909, a transceiver 906, and a vibrator 920. Tactile communication device 900 can both create and provide vibrotactile sequences to a user. Accelerometer 909 measures movements and accelerations of tactile communication device 900 and may be used to create a vibrotactile sequence to be communicated to another tactile communication device. Certain movements, accelerations, forces, etc., signify a different feedback. Transceiver 906 sends this feedback in the form of a signal to another device or network. Transceiver 906 may also receive incoming signals containing vibrotactile sequences transmitted from another device, for instance via a network. These signals may include tactile feedback to be provided by tactile communication device 900 through vibrator 920.

Figure 10:
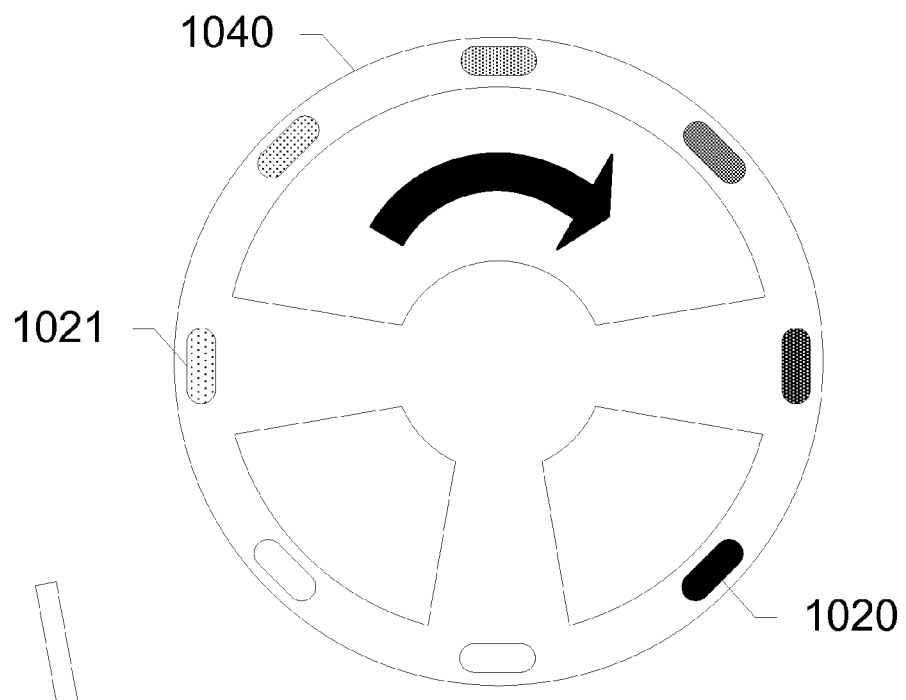
FIG. 10 shows a steering wheel equipped with a series of vibrators embedded in the circumference of steering wheel, according to an exemplary embodiment of the present invention.

FIG. 10 shows a steering wheel 1040 equipped with a series of vibrators embedded in the circumference of steering wheel 1040, according to an exemplary embodiment of the present invention. Steering wheel 1040 is for an automobile. Users of automobiles utilize GPS or other navigation devices which give turn-by-turn directions. Typically, these devices give audible directions so that the user does not have to look at the map. Steering wheel 1040 can communicate with these devices and output the directions through vibrotactile output. When the navigation device indicates a right turn, the vibrators activate in sequence in a clock-wise direction. For instance, vibrator 1021 is activated first, then the vibrators activated in succession until vibrator 1020. The various shades of the vibrators indicate a time lapse of when each vibrator is to be activated. Vibrator 1021 is to be activated first, while vibrator 1020 is activated last. Conversely, when the navigation device indicates a left turn, the vibrators activate in sequence in a counter-clock-wise direction.

In other exemplary embodiments of a vibrotactile steering wheel, two vibrators are used. One vibrator is under the left hand, and the other is under the right hand as the driver holds the steering wheel at 10 and 2. Many other configurations are capable of alerting the driver of right or left turns. Vibrators can be placed in other key locations to alert the driver of other events. Further, vibrators can be used as input devices enabling a driver to communicate commands to electronic components of the vehicle without moving her hands from the steering wheel.

Figure 11:
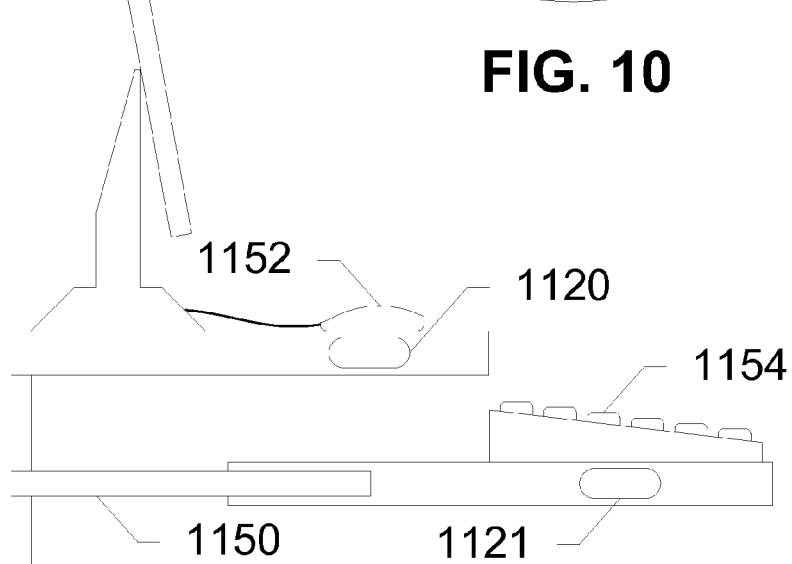
FIG. 11 shows a vibrotactile office desk, according to an exemplary embodiment of the present invention.

FIG. 11 shows a side perspective of a vibrotactile office desk 1150, according to an exemplary embodiment of the present invention. Vibrotactile office desk 1150 includes a mouse vibrator 1120 embedded underneath a computer mouse 1152, and a keyboard vibrator 1121 embedded underneath a computer keyboard 1154. While other alerts at the office are purely visual or audible, vibrotactile office desk alerts a user by vibrating areas of the desk near where a user's skin is in contact with the desk. Vibrotactile office desk 1150 can communicate with other communication devices, for instance across a network, to receive vibration commands or vibrotactile sequences. Once received, vibrotactile office desk 1150 activates vibrators 1120 and 1121 to alert the user of the event. For example, a particular e-mail thread might be getting a lot of activity in the user's e-mail inbox. This is probably something the user would want to look at and/or address. However, since the user is so focused on a particular task (say looking over a spreadsheet), the user doesn't check their e-mail. Visual e-mail alerts can be distracting, particularly when users regularly receive a lot of email. The tactile alert delivered via vibrotactile office desk 1150 cues the user that they may be interested in this email activity. The user can easily ignore or disable the cues if uninterested.

Figure 12:
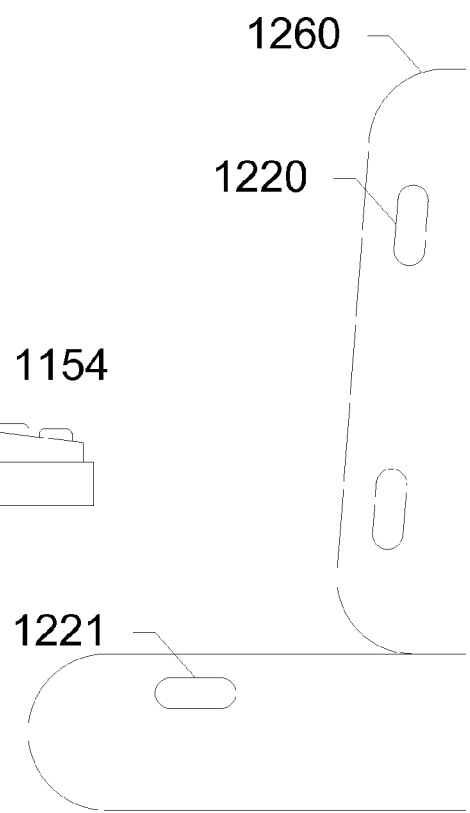
FIG. 12 shows a vibrotactile chair, according to an exemplary embodiment of the present invention.

FIG. 12 shows a vibrotactile chair 1260, according to an exemplary embodiment of the present invention. Vibrotactile chair 1260 includes back vibrators 1220 and seat vibrator 1221. The vibrators 1220 and 1221 respond to events sent by a communication device in communication with vibrotactile chair 1260. The response depends on the type of event, which also depends on the type of communication device. If vibrotactile chair 1260 is in an office, and in communication with the user's business communication device, then vibrotactile chair 1260 alerts the user of important emails, phone calls, etc. However, if vibrotactile chair 1260 is the driver's seat of an automobile, and in communication with the automobile, then vibrotactile chair 1260 alerts the user of upcoming turns, and warns of blind-spot encroachments. In these embodiments vibrators 1220 are embedded in the chair behind the left and right shoulders. A vibration behind the left shoulder indicates a blind-spot encroachment to the left, while a vibration behind the right shoulder indicates a blind-spot encroachment to the right.

There are many other devices, equipment, objects, etc., that include vibrators to alert users of different events. For instance, large quantities of smaller vibrators may be distributed along an external periphery of communication devices to enable output of textural sensations to complement a display output device. Other items and placement of vibrators within these items will become apparent to those having skill in the art upon reading this disclosure.

Figure 13:
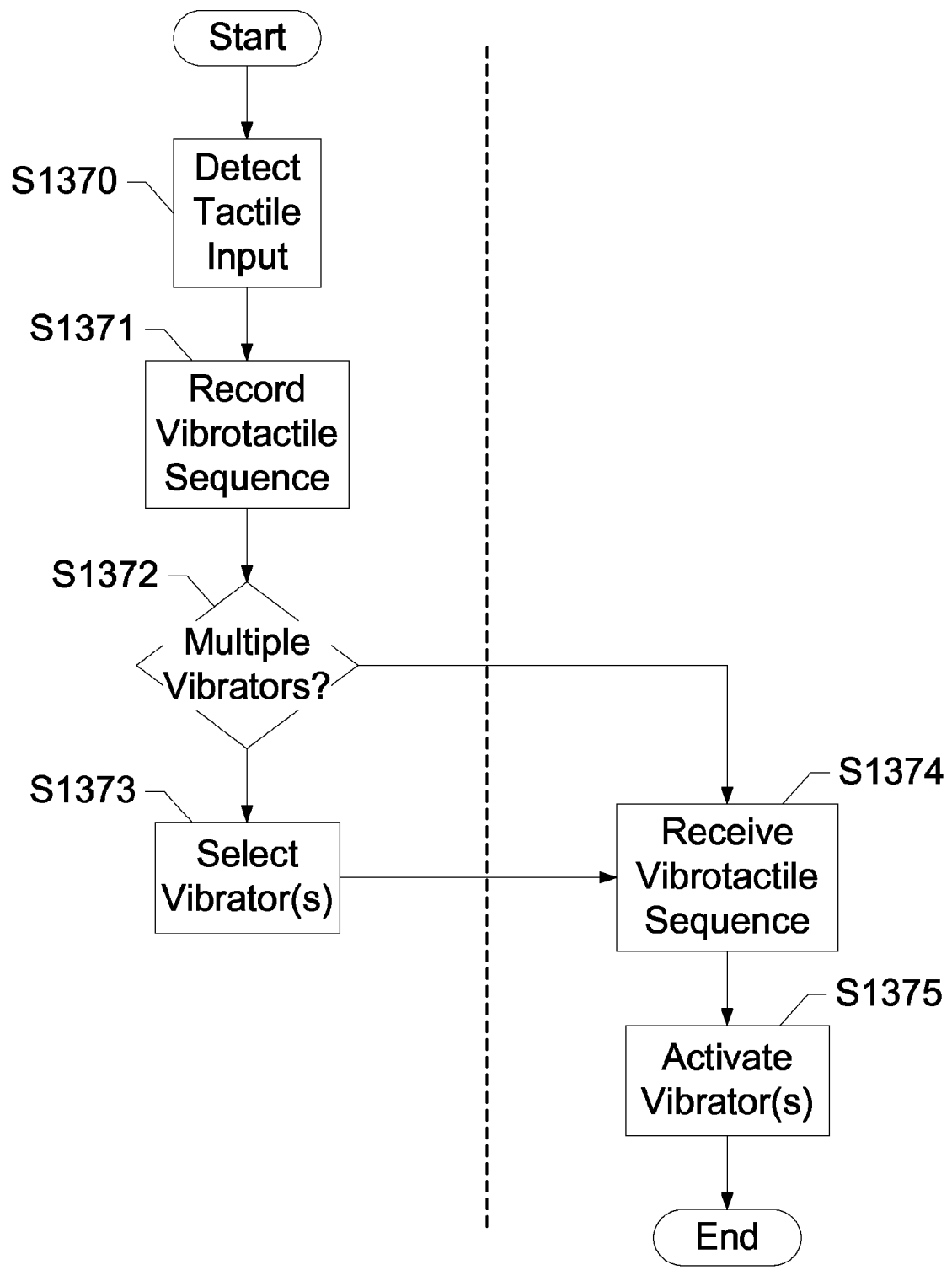
FIG. 13 shows a method for delivering a vibrotactile alert from a control communication device to a tactile communication device.

FIG. 13 shows a method for delivering a vibrotactile alert from a control communication device to a tactile communication device. In FIG. 13, steps on the left side of the dotted line are performed by the control communication device while steps on the right side of the dotted line are performed by the tactile communication device. The method starts at the control communication device, where the control communication device receives tactile input from a user S1370. The input may come from the user utilizing a touch pad, touch screen, or accelerometer, such as using control communication device 700 of FIG. 7, for direct input. Alternately, the user can convert an existing audible sequence into a vibrotactile sequence. The tactile input is detected and recorded into a vibrotactile sequence 1371. Some tactile communication devices have different vibrators for different events. For instance, some have traditional offset weight vibrators while others have more sophisticated voice coil vibrators. If the vibrotactile sequence contains instructions for tapping or rubbing, then a voice coil vibrator must be used. Also, some tactile communication devices have placed vibrators in key locations, such as steering wheel 1040 and snowboard 800. The control communication device needs to specify which vibrator to activate to alert the user of a specific event. For this reason, the control communication device must determine whether or not the tactile communication device supports multiple vibrators 1372. If the tactile communication device does support multiple vibrators, and the vibrotactile sequence requires a specific vibrator to be activated, then the control communication device selects one or more vibrators to activate 1373. In either case, the vibrotactile sequence is sent to the tactile communication device The tactile communication device first receives the vibrotactile sequence 1374. The vibrotactile sequence may also come with instructions to activate selected vibrators. In any case, the tactile communication device activates the vibrators per the instructions in the vibrotactile sequence.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A tactile communication device comprising:
    a vibrator comprising a first voice coil motor, the first voice coil motor comprising a head, and the head comprising a second voice coil motor;
    a processor; and
    a memory that stores instructions that, when executed by the processor, cause the processor to perform operations comprising
        in response to an event that triggers the vibrator, determining whether a standard vibration or a non-standard vibration is to be used for the event,
        if the processor determines that the standard vibration is to be used for the event, sending a standard signal to the vibrator to instruct the vibrator to vibrate for a predefined duration,
        if the processor determines that the non-standard vibration is to be used for the event,
            creating a vibrotactile sequence, and
            instructing the vibrator to vibrate according to the vibrotactile sequence.

2. The tactile communication device in claim 1, wherein the first voice coil motor is oriented for one of tapping and rubbing.

3. The tactile communication device in claim 1, wherein creating the vibrotactile sequence comprises creating the vibrotactile sequence based, at least in part, upon an audible clip.

4. The tactile communication device in claim 1, further comprising a touch screen.

5. The tactile communication device in claim 1, further comprising an accelerometer.

6. The tactile communication device in claim 1, further comprising a housing for incorporating the device within a snowboard, a keychain, a steering wheel, a desk, or a chair.

7. A tactile communication system comprising:
    a tactile communication device comprising
        a vibrator comprising a first voice coil motor, the first voice coil motor comprising a head, and the head comprising a second voice coil motor
        a tactile communication device processor, and
        a tactile communication device memory; and
    a control communication device in communication with the tactile communication device, the control communication device comprising
        a tactile input device through which a user can provide a tactile input,
        a control communication device processor, and
        a control communication device memory that stores control communication device instructions that, when executed by the control communication device processor, cause the control communication device processor to perform control communication device operations comprising
            detecting the tactile input from the user as provided via the tactile input device,
            generating a vibrotactile sequence based, at least partially, upon the tactile input, and
            sending the vibrotactile sequence to the tactile communication device; and
    wherein the tactile communication device processor executes tactile communication device instructions stored on the tactile communication device memory to perform tactile communication device operations comprising
        receiving the vibrotactile sequence from the control communication device, and
        activating the vibrator according to the vibrotactile sequence.

8. The tactile communication system in claim 7, wherein the first voice coil motor is oriented for one of tapping and rubbing.

9. The tactile communication system in claim 7, wherein the tactile input device is a touch pad, a touch screen, or an accelerometer.

10. The tactile communication system in claim 7, wherein the control communication device memory stores further control communication device instructions that, when executed by the control communication device processor, cause the control communication device processor to perform further control communication device operations comprising receiving an audible clip and converting the audio clip into a second vibrotactile sequence.

11. The tactile communication system in claim 7, wherein the control communication device and the tactile communication device communicate across a network.

12. A method of tactile communication, the method comprising:
- in response to an event that triggers a vibrator, determining, by a tactile communication device comprising a processor, whether a standard vibration or a non-standard vibration is to be used for the event,
- if the tactile communication device determines that the standard vibration is to be used for the event, sending, by the tactile communication device, a standard signal to the vibrator to instruct the vibrator to vibrate for a predefined duration,
- if the tactile communication device determines that the non-standard vibration is to be used for the event,
  - creating, by the tactile communication device, a vibrotactile sequence, and
  - instructing, by the tactile communication device, the vibrator to vibrate according to the vibrotactile sequence;
- wherein the vibrator comprises a first voice coil motor, the first voice coil motor comprising a head, and the head comprising a second voice coil motor.

13. The method in claim 12, further comprising determining that only selected vibrators are activated, the selected vibrators comprising the vibrator and at least a further vibrator.

14. The method in claim 12, further comprising determining that the tactile communication device supports multiple vibrators.

15. The method in claim 12, wherein creating the vibrotactile sequence comprises creating the vibrotactile sequence based, at least in part, upon an audible clip.

* * * * *